United States Patent
Murakami et al.

(10) Patent No.: US 8,808,917 B2
(45) Date of Patent: Aug. 19, 2014

(54) POWER STORAGE DEVICE HAVING OLIVINE TYPE POSITIVE ELECTRODE ACTIVE MATERIAL WITH ORIENTED CRYSTAL STRUCTURE

(75) Inventors: Satoshi Murakami, Kanagawa (JP); Takahiro Kawakami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 557 days.

(21) Appl. No.: 12/871,974

(22) Filed: Aug. 31, 2010

(65) Prior Publication Data

US 2011/0065004 A1 Mar. 17, 2011

(30) Foreign Application Priority Data

Sep. 11, 2009 (JP) .................... 2009-210242

(51) Int. Cl.
*H01M 4/136* (2010.01)
(52) U.S. Cl.
USPC ........................................ 429/231.1
(58) Field of Classification Search
None
See application file for complete search history.

(56) References Cited

U.S. PATENT DOCUMENTS

| 6,872,492 | B2 | 3/2005 | Barker et al. |
| 7,288,791 | B2* | 10/2007 | Umeno et al. ............ 257/64 |
| 7,759,008 | B2 | 7/2010 | Barker et al. |
| 2002/0001746 | A1* | 1/2002 | Jenson .................. 429/162 |
| 2004/0241540 | A1* | 12/2004 | Tsutsumi et al. ........ 429/122 |
| 2005/0035349 | A1 | 2/2005 | Umeno et al. |
| 2005/0238961 | A1 | 10/2005 | Barker et al. |
| 2007/0072034 | A1 | 3/2007 | Barker et al. |
| 2007/0160519 | A1 | 7/2007 | Barker et al. |
| 2007/0280848 | A1 | 12/2007 | Narayan et al. |
| 2009/0286159 | A1 | 11/2009 | Nuspl et al. |

(Continued)

FOREIGN PATENT DOCUMENTS

| CN | 001723578 | 1/2006 |
| CN | 101189747 | 5/2008 |

(Continued)

OTHER PUBLICATIONS

Suzuki.K et al., "Synthesis of LiFePO4 epitaxial thin film and characterization of the bulk and surface structural changes,", Abstracts of Annual meeting of the Electrochemical Society of Japan, Mar. 29, 2009, vol. 76, p. 332.

(Continued)

*Primary Examiner* — Patrick Ryan
*Assistant Examiner* — Lucas J O Donnell
(74) *Attorney, Agent, or Firm* — Nixon Peabody LLP; Jeffrey L. Costellia (57) ABSTRACT

An object is to increase the amount of ions capable of leaving and entering an active material so as to increase capacity of a secondary battery. The present invention relates to a manufacturing method of a power storage device including a positive electrode active material formed using a composite oxide containing at least alkali metal and transition metal. The method includes the steps of: forming a base layer over a support substrate; forming a layer of lithium iron phosphate or a layer of sodium iron phosphate over the base layer; and using a layer of single crystalline lithium iron phosphate having an olivine structure or a layer of single crystalline sodium iron phosphate having an olivine structure with crystal axes oriented in a <010> direction as the positive electrode material by converting the layer of lithium iron phosphate or the layer of sodium iron phosphate by a heat treatment.

10 Claims, 8 Drawing Sheets

(56) References Cited

U.S. PATENT DOCUMENTS

| | | | |
|---|---|---|---|
| 2010/0159333 A1* | 6/2010 | Sugiura et al. | 429/231.8 |
| 2010/0273056 A1 | 10/2010 | Kanda et al. | |
| 2011/0008233 A1 | 1/2011 | Miyanaga et al. | |
| 2011/0031105 A1 | 2/2011 | Miyanaga | |
| 2011/0162972 A1* | 7/2011 | Furuya et al. | 205/223 |

FOREIGN PATENT DOCUMENTS

| | | |
|---|---|---|
| CN | 101627493 | 1/2010 |
| EP | 1 722 428 A1 | 11/2006 |
| EP | 2 214 248 A1 | 8/2010 |
| EP | 2 239 806 A1 | 10/2010 |
| JP | 05-171417 | 7/1993 |
| JP | 06-187994 | 7/1994 |
| JP | 2001-167762 | 6/2001 |
| JP | 2004-079276 | 3/2004 |
| JP | 2004-533706 | 11/2004 |
| JP | 2008-285372 | 11/2008 |
| JP | 2008-541364 | 11/2008 |
| JP | 2009-206085 A | 9/2009 |
| JP | 2009-266821 A | 11/2009 |
| WO | WO 02/097907 A2 | 12/2002 |
| WO | WO 2006/105253 A2 | 10/2006 |
| WO | WO 2006/119995 A1 | 11/2006 |
| WO | WO 2008/109602 A2 | 9/2008 |
| WO | WO 2009/063747 A1 | 5/2009 |
| WO | WO 2009/096335 A1 | 8/2009 |

OTHER PUBLICATIONS

Hirayama.M et al., "Direct observation of the bulk and surface structure of LiFePO4 epitaxial thin film,", Abstracts of Annual meeting of the Electrochemical Society of Japan, Mar. 29, 2008, vol. 75, p. 21.

International Search Report (Application No. PCT/JP2010/064853; PCT12671) Dated Nov. 22, 2010.

Written Opinion (Application No. PCT/JP2010/064853; PCT12671) Dated Nov. 22, 2010.

Suzuki., K et al., "Synthesis of $LiFePO_4$ epitaxial thin film and characterization of the bulk and surface structural changes," Abstracts of Annual Meeting of the Electrochemical Society of Japan, Mar. 29, 2009, vol. 76, p. 332.

Hirayama, M. et al., "Direct observation of the bulk and surface structure of $LiFePO_4$ epitaxial thin film," Abstracts of Annual Meeting of the Electrochemical Society of Japan, Mar. 29, 2008, vol. 75, p. 21.

Chinese Office Action (Application No. 201080041544.2) Dated Jan. 6, 2014.

\* cited by examiner

POWER STORAGE DEVICE HAVING OLIVINE TYPE POSITIVE ELECTRODE ACTIVE MATERIAL WITH ORIENTED CRYSTAL STRUCTURE

TECHNICAL FIELD

One embodiment of the invention to be disclosed relates to a power storage device and a manufacturing method thereof.

BACKGROUND ART

In recent years, with an increase of environmental engineering, development of power generation technologies (e.g., solar photovoltaic power generation) which pose fewer burdens on the environment than conventional power generation methods has been actively conducted. Concurrently with the development of power generation technology, development of power storage technology has also been underway.

As a power storage technology, for instance, there is a power storage device such as a lithium ion secondary battery. Lithium ion secondary batteries are widely prevalent since their energy density is high and because they are well suited for miniaturization.

As a positive electrode active material of a lithium on secondary battery, for example, there are a composite oxide containing at least alkali metal and transition metal and a composite oxide containing at least alkaline earth metal and transition metal. Specifically, an iron phosphate compound ($AFePO_4$, where A is alkali metal such as lithium (Li) or sodium (Na) or alkaline earth metal such as magnesium (Mg) or calcium (Ca)) having an olivine structure can be given.

For example, in lithium iron phosphate ($LiFePO_4$) having an olivine structure, lithium ions are arranged one-dimensionally in <010>, <001>, and <101> directions in such a manner that the ions are connected to each other. In lithium iron phosphate having an olivine structure, lithium ions move in these directions to leave and enter the lithium iron phosphate, whereby charging and discharging are performed. Lithium ions move in a <010> direction more easily than in the other two directions. It is known that lithium iron phosphate ($LiFePO_4$) having an olivine structure possesses favorable characteristics owing to its lithium arranged one-dimensionally and has excellent safety because it does not release oxygen even when heated to higher than 350° C.

A positive electrode active material layer which contains an iron phosphate compound ($AFePO_4$) having an olivine structure as an active material is formed in such a manner that particles of lithium iron phosphate are mixed with a conductive agent (e.g., carbon) and a binder and the mixture is shaped over a current collector (for example, see Patent Document 1). Generally, when a ratio of a material which ions can leave and enter (i.e., an active material; here, lithium iron phosphate) is increased in an active material layer with the volume of the active material layer unchanged, the amount of ions capable of leaving and entering the active material is increased, which can lead to an increase in capacity of a battery.

REFERENCE

Patent Document

[Patent Document 1] Japanese Published Patent Application No. 2004-079276

DISCLOSURE OF INVENTION

An object of one embodiment of the disclosed invention is to increase the amount of ions capable of leaving and entering an active material so as to increase capacity of a battery.

One embodiment of the disclosed invention is a manufacturing method of a power storage device which includes a positive electrode active material formed using a composite oxide containing at least alkali metal and transition metal. The manufacturing method of the power storage device includes the steps of: forming a base layer over a support substrate; forming a layer of sodium iron phosphate over the base layer; and using a layer of single crystalline sodium iron phosphate having an olivine structure with a crystal axis oriented in a <010> direction as the positive electrode active material by converting the layer of sodium iron phosphate by a heat treatment.

One embodiment of the disclosed invention is a manufacturing method of a power storage device including a positive electrode active material formed using a composite oxide containing at least alkali metal and transition metal. The manufacturing method of the power storage device includes the steps of: forming a base layer over a support substrate; forming a layer of lithium iron phosphate over the base layer; and using a layer of single crystalline lithium iron phosphate having an olivine structure with a crystal axis oriented in a <010> direction as the positive electrode active material by converting the layer of lithium iron phosphate by a heat treatment.

One embodiment of the disclosed invention is a power storage device including: a positive electrode including a positive electrode active material provided in contact with a base layer over a support substrate and formed using single crystalline sodium iron phosphate having an olivine structure with a crystal axis oriented in a <010> direction and a lattice constant being equivalent to that of a material of the base layer, and a positive electrode current collector; a negative electrode including a negative electrode active material and a negative electrode current collector; a separator provided between the positive electrode and the negative electrode; and an electrolyte.

One embodiment of the disclosed invention is a power storage device including: a positive electrode including a positive electrode active material provided in contact with a base layer over a support substrate and formed using single crystalline lithium iron phosphate having an olivine structure with a crystal axis oriented in a <010> direction and a lattice constant being equivalent to that of a material of the base layer, and a positive electrode current collector; a negative electrode including a negative electrode active material and a negative electrode current collector; a separator provided between the positive electrode and the negative electrode; and an electrolyte.

In one embodiment of the disclosed invention, the base layer is formed using a material selected from β-Ta, $Cu_2[Cd_{0.79}Fe_{0.17}Mn_{0.04}]GeS_4$, $Cu_2FeGeS_4$, $CuFeS_2$, $CuGaS_2$, $Cu_3[As_{0.644}Sb_{0.356}]S_4$, $Cu_9Fe_9S_{16}$, $CaV_3O_7$, $WO_3 \cdot H_2O$, $Fe_2SiO_4$, $Mg_2SiO_4$, $Li_3PO_4$, $Cu_3Fe_4[VO_4]_6$, $[Fe_{0.292}Mg_{0.708}]_2SiO_4$, $NaSiO_3$, and $LiAlSiO_4 \cdot H_2O$.

According to one embodiment of the disclosed invention, the amount of ions capable of leaving and entering an active material can be increased; thus, capacity of a battery can be increased.

BEST MODE FOR CARRYING OUT THE INVENTION

Embodiments of the invention disclosed in this specification will be hereinafter described with reference to drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments. Note that, in the drawings hereinafter shown, the same portions or portions having similar functions are denoted by the same reference numerals, and repeated description thereof will be omitted.

EMBODIMENT

In this embodiment, a power storage device, a manufacturing method thereof, and a manufacturing method of a positive electrode are described with reference to FIG. 1, FIGS. 2A to 2D, FIGS. 3A to 3C, FIGS. 4A to 4D, FIG. 7, and FIG. 8.

Figure 1:
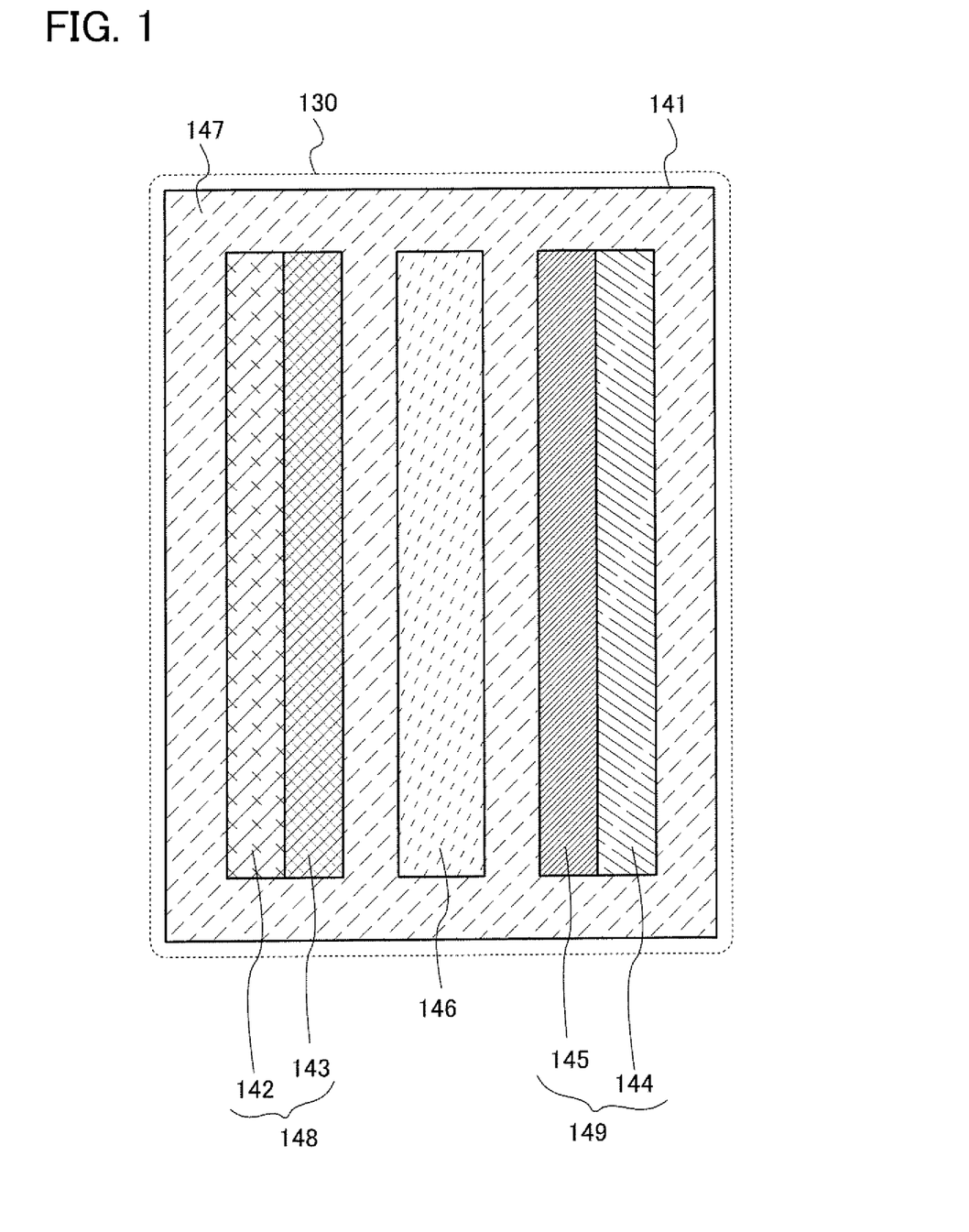
FIG. 1 is a cross-sectional view illustrating a power storage device.

A structure of a secondary battery 130 of this embodiment is illustrated in FIG. 1. The secondary battery 130 has a housing 141, a positive electrode 148 including a positive electrode current collector 142 and a positive electrode active material layer 143, a negative electrode 149 including a negative electrode current collector 144 and a negative electrode active material layer 145, a separator 146 provided between the positive electrode 148 and the negative electrode 149, and an electrolyte 147.

Figure 7:
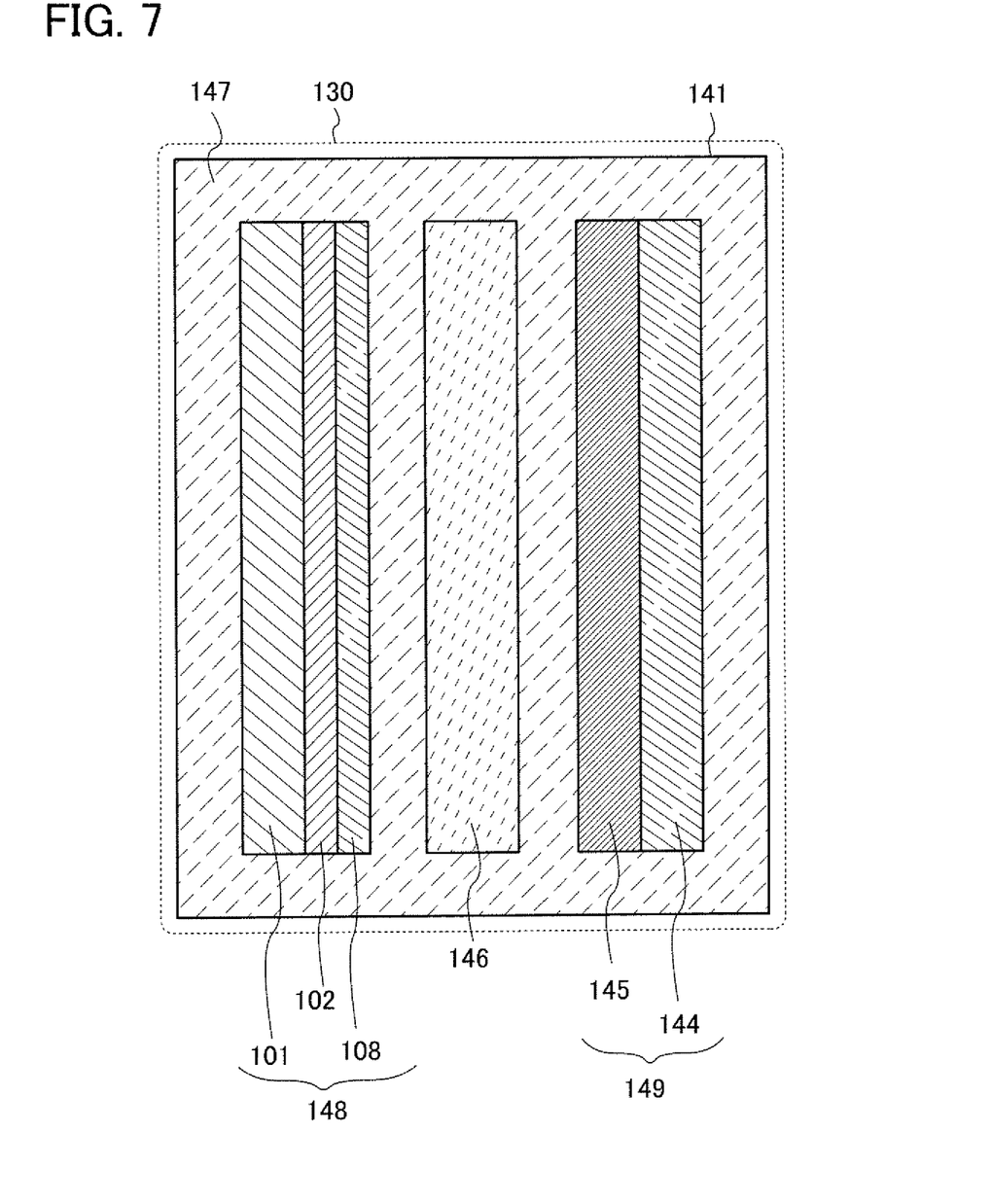
FIG. 7 is a cross-sectional view illustrating a power storage device.
Figure 8:
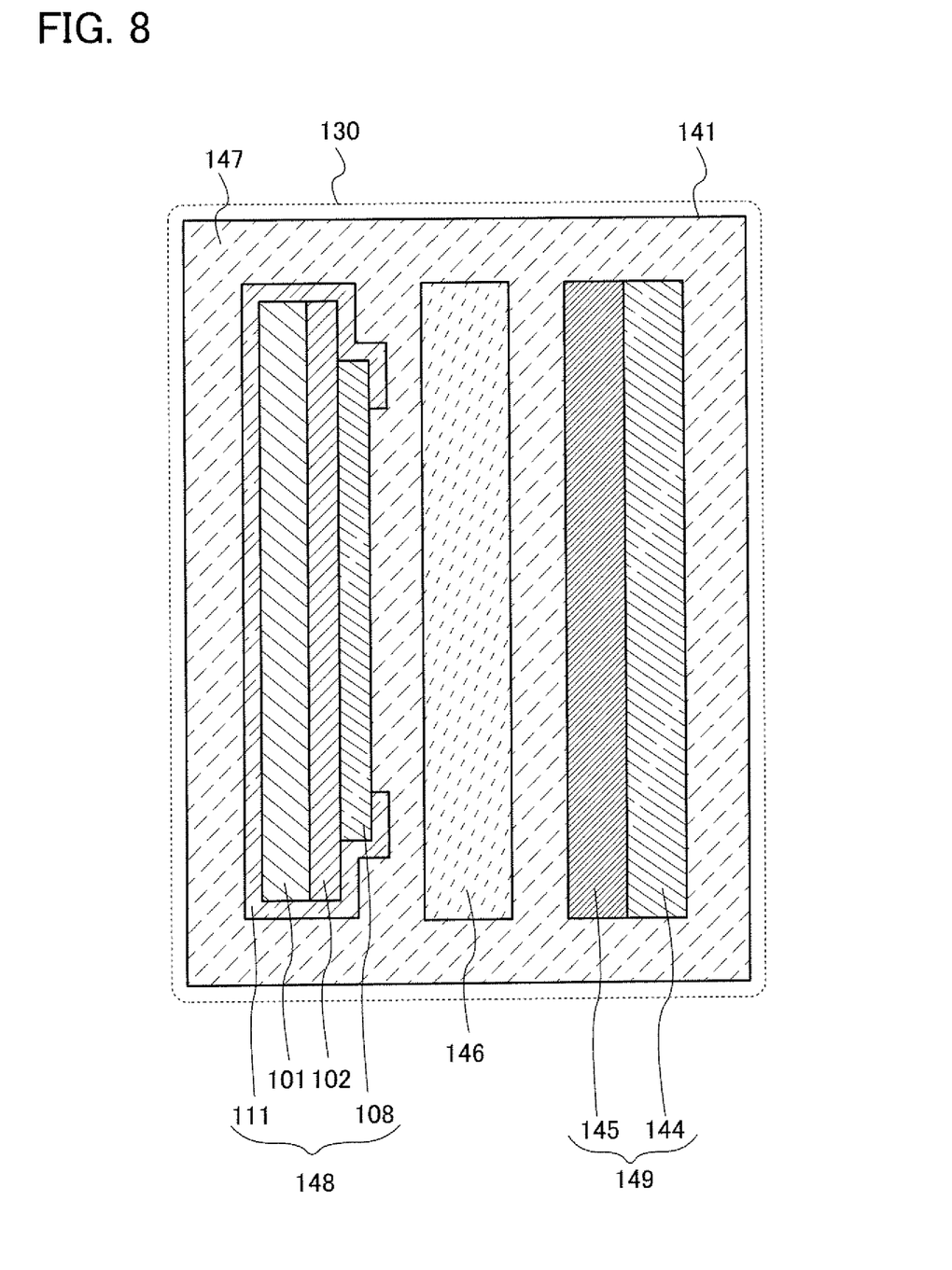
FIG. 8 is a cross-sectional view illustrating a power storage device.

Specifically, as the positive electrode active material layer 143, a single crystalline active material layer 108 illustrated in FIG. 7 or that illustrated in FIG. 8 is used. The single crystalline active material layer 108 is provided in contact with a base layer 102 which is over a support substrate 101. The single crystalline active material layer 108 is a layer of single crystalline sodium iron phosphate having an olivine structure or a layer of single crystalline lithium iron phosphate having an olivine structure with a crystal axis oriented in a <010> direction and a lattice constant being equivalent to that of a material of the base layer 102.

The base layer 102 is formed using a material selected from β-Ta, Cu$_2$[Cd$_{0.79}$Fe$_{0.17}$Mn$_{0.04}$]GeS$_4$, Cu$_2$FeGeS$_4$, CuFeS$_2$, CuGaS$_2$, Cu$_3$[As$_{0.644}$Sb$_{0.356}$]S$_4$, Cu$_9$Fe$_9$S$_{16}$, CaV$_3$O$_7$, WO$_3$.H$_2$O, Fe$_2$SiO$_4$, Mg$_2$SiO$_4$, Li$_3$PO$_4$, Cu$_3$Fe$_4$[VO$_4$]$_6$, [Fe$_{0.292}$Mg$_{0.708}$]$_2$SiO$_4$, NaSiO$_3$, and LiAlSiO$_4$.H$_2$O.

Each of the above materials has a lattice constant which is equivalent to that of lithium iron phosphate having an olivine structure or sodium iron phosphate having an olivine structure. The layer of lithium iron phosphate or the layer of sodium iron phosphate which is formed over the base layer 102 is epitaxially grown reflecting a specific lattice plane of the base layer 102 so as to be a layer of single crystalline lithium iron phosphate having an olivine structure or a layer of single crystalline sodium iron phosphate having an olivine structure.

In the layer of single crystalline lithium iron phosphate having an olivine structure or the layer of single crystalline sodium iron phosphate having an olivine structure, lithium ions or sodium ions are arranged one-dimensionally in <010>, <001>, and <101> directions in such a manner that the ions are connected to each other.

In the above manner, the layer of single crystalline sodium iron phosphate having an olivine structure or the layer of single crystalline lithium iron phosphate having an olivine structure with a crystal axis oriented in a <010> direction and a lattice constant being equivalent to that of the material of the base layer 102 is obtained.

Hereinafter, a method for forming the layer of single crystalline sodium iron phosphate having an olivine structure or the layer of single crystalline lithium iron phosphate having an olivine structure and a method for manufacturing a power storage device will be described.

Figure 2A:
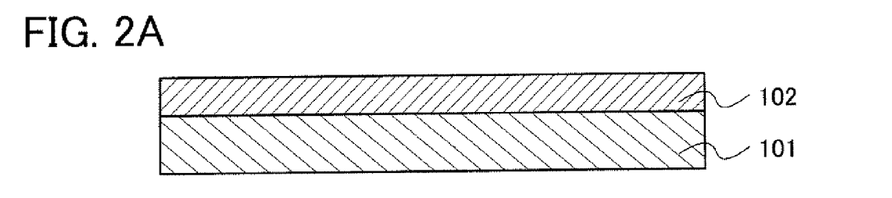
FIGS. 2A to 2D are cross-sectional views illustrating a manufacturing process of a power storage device.

First, the base layer 102 is formed over the support substrate 101 (see FIG. 2A). A surface of the support substrate 101, over which the base layer 102 is formed, may have a specific lattice plane. The "specific lattice plane" is a plane which allows a material layer 103, which is to be the single crystalline active material layer 108 in a later step, to be (epitaxially) grown to be a single crystalline layer. Examples of such a support substrate 101 are a silicon substrate, a sapphire substrate, and the like.

In this embodiment, a silicon substrate is used as the support substrate 101 and is placed so that the base layer 102 is formed on a (100) plane of the support substrate 101.

Note that the support substrate 101 is not limited to the above substrates when the base layer 102 is a layer allowing crystal growth in the material layer 103 to change the material layer 103 into a layer which has a single crystal structure without the support substrate 101. In that case, a glass substrate, a ceramic substrate or the like can be used as the support substrate 101.

As the base layer 102, a layer is formed using one of the aforementioned materials.

Those materials allow crystal growth (epitaxial growth) in the material layer 103, which is to be the single crystalline active material layer 108 in a later step, so as to change the material layer 103 into a layer which has a single crystal structure. Since the material contained in the base layer 102 has a lattice constant which is equivalent to that of the single crystalline active material layer 108, the material layer 103 can be converted to the single crystalline active material layer 108.

In this embodiment, β-Ta (tantalum) is used as the material contained in the base layer 102. Two kinds of crystal phases are known for a tantalum thin film: cubic α-Ta in a stable phase having the same structure as a bulk and tetragonal β-Ta in a metastable phase. In this embodiment, a film of β-Ta is formed as the base layer 102.

Specifically, the film of β-Ta is formed on the (100) plane of the silicon substrate using a UHV DC magnetron sputtering apparatus in the following conditions: vacuum evacuation is performed first in a chamber of the sputtering apparatus to obtain a pressure less than or equal to $3.9 \times 10^{-6}$ Pa; argon (Ar) is used as a sputtering gas; the pressure for the gas was set to 0.26 Pa; and the substrate temperature is room temperature.

The lattice constants of the β-Ta are as follows: a is 1.0211 (nm); b is 1.0211 (nm); and c is 0.53064 (nm). The lattice constants a and c and the lattice constants b and c of the β-Ta are close to lattice constants a and c of the lithium iron phosphate ($LiFePO_4$) having an olivine structure or those of the sodium iron phosphate ($NaFePO_4$) having an olivine structure, which is used for the single crystalline active material layer 108. Therefore, smoother epitaxial growth in the material layer 103 (described later in detail) is realized, whereby the layer of lithium iron phosphate ($LiFePO_4$) having an olivine structure or the layer of sodium iron phosphate ($NaFePO_4$) having an olivine structure can be obtained.

Note that the lattice constants of the lithium iron phosphate having an olivine structure are as follows: a is 1.0371 (nm); b is 0.6047 (nm); and c is 0.4739 (nm). The lattice constants of the sodium iron phosphate having an olivine structure are as follows: a is 1.0415 (nm); b is 0.6243 (nm); and c is 0.4738 (nm).

Figure 2B:
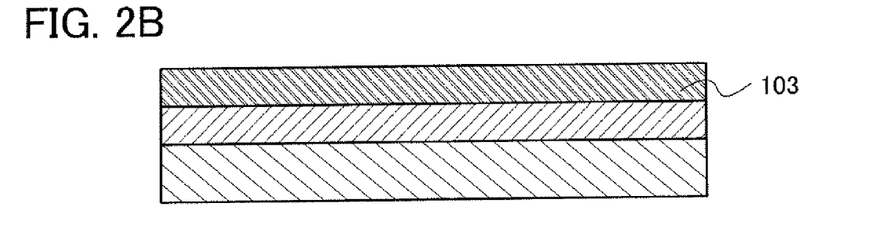

Then, the material layer 103 is formed over the base layer 102 by a sputtering method (see FIG. 2B).

As the material layer 103, an amorphous material layer, a microcrystalline material layer, a polycrystalline material layer or the like is formed. The material layer 103 is converted to a single crystalline layer by being provided with energy in a later step.

A process of conversion of the material layer 103, which is an amorphous material layer, a microcrystalline material layer, a polycrystalline material layer or the like, to the single crystalline active material layer 108 is described below. After formation of the material layer 103, which is an amorphous material layer, a microcrystalline material layer, a polycrystalline material layer or the like, energy is provided to the material layer 103. By the energy provided to the material layer 103, epitaxial growth in the material layer 103 progresses reflecting an interface between the material layer 103 and the base layer 102 which are in contact with each other. This epitaxial growth progresses with a crystal axis being oriented in a <010> direction. In this manner, the single crystalline active material layer 108 in which a crystal axis is oriented in a <010> direction can be obtained from the material layer 103.

The single crystalline active material layer 108 may be formed without formation and conversion of an amorphous material layer, a microcrystalline material layer, or a polycrystalline material layer, if possible. In that case, deposition of the single crystalline active material layer 108 over the base layer 102 is performed.

In this embodiment, a process of formation of a polycrystalline material layer as the material layer 103 by a sputtering method and conversion thereof to a single crystalline layer by heating is described below.

As the material layer 103, a layer of lithium iron phosphate is formed in this embodiment.

A manufacturing method of a lithium iron phosphate target used in the sputtering method is described below.

As materials of the lithium iron phosphate, $Li_2CO_3$, $FeC_2O_4$, and $NH_4H_2PO_4$, decomposition products of which are not easily corroded, are used. Mixture ratios of the above materials are determined such that the stoichiometric ratio of lithium (Li) to iron (Fe) to phosphorus (P)=1:1:1. After the mixture ratios are determined, a planetary ball mill which contains the materials and which uses zirconia balls each having a diameter less than or equal to 3 mm is rotated at greater than or equal to 300 rpm; thus, a powdered and uniformly mixed material can be obtained. The powdered and uniformly mixed material can lead to a uniform sintered lithium iron phosphate.

For promotion of a solid phase reaction, the mixed material is pelletized and subjected to pre-bake which is performed in an argon atmosphere at a temperature of 350° C. for ten hours. By the pre-bake, removal of a cracked gas and a solid phase reaction are promoted. A reacted product is crushed in a mortar after the pre-bake, and decomposition products formed by the pre-bake and lithium iron phosphate having relatively low crystallinity in which a solid phase reaction is caused are powdered and uniformly mixed using a ball mill.

This pre-baked material is subjected to pressing at greater than or equal to 300 kgf so as to be pelletized. An obtained pellet is heated in an argon atmosphere at 600° C. to 800° C. so that a solid phase reaction is promoted and sintering is performed. In this manner, a baked material of lithium iron phosphate can be obtained. Note that although single crystalline $LiFePO_4$ can be obtained when the temperature is lower than or equal to 600° C., this is not preferable because enough sintering cannot be achieved. Note also that in the case where the temperature is higher than or equal to 800° C., by-product such as $Li_3PO_4$ is precipitated, which is not preferable.

With a hot pressing apparatus, this baked material of lithium iron phosphate is subjected to pressing at high pressure and baking in an argon atmosphere at a temperature ranging from 600° C. to 800° C. so that a solid phase reaction is caused and sintering is performed. In this manner, a sintered target can be obtained.

The sintered target which has been obtained and the support substrate 101 over which the base layer 102 is formed are placed in a vacuum chamber, and the material layer 103 is formed over the base layer 102 by a sputtering method using argon, for example, as a sputtering gas.

Next, the material layer 103 is melted in a linear shape (a band shape) and the melted region is moved. That is, the material layer 103 which is the polycrystalline material layer is melted and solidified. By melting and solidifying the material layer 103, the single crystalline active material layer 108 is formed (see FIGS. 2C and 2D, FIG. 3C, and FIG. 4A).

A process of melting the material layer 103 to form the single crystalline active material layer 108 is described below.

First, a protective film 104 is formed over the material layer 103. The protective film 104 prevents the material layer 103 which is melted in a heating step from breaking into balls due to surface tension. As the protective film 104, for example, a silicon oxide film may be used. Note that when the protective film 104 is not necessary, formation thereof is not performed in some cases.

The material layer 103 can be melted in a linear shape by a strip heater method using a carbon rod having an elongated shape through which current flow as heat source, a lamp method using a lamp in a linear shape, or the like, for example. In this embodiment, a carbon rod having an elongated shape through which current flows is used as a heater 105 having a linear shape (see FIGS. 2C and 2D).

Figure 2C:
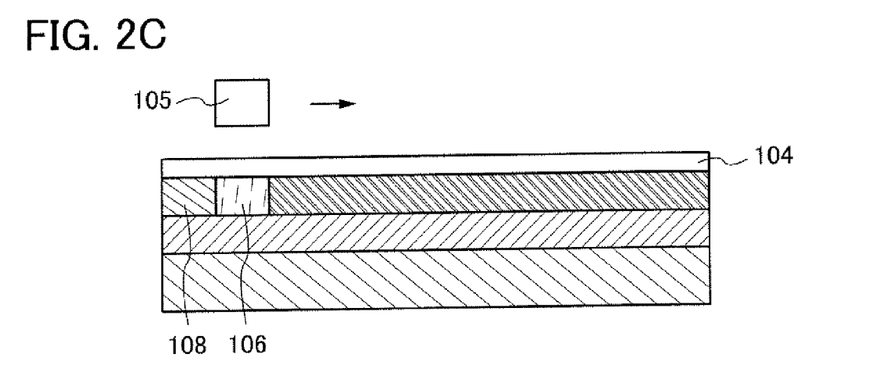
Figure 2D:
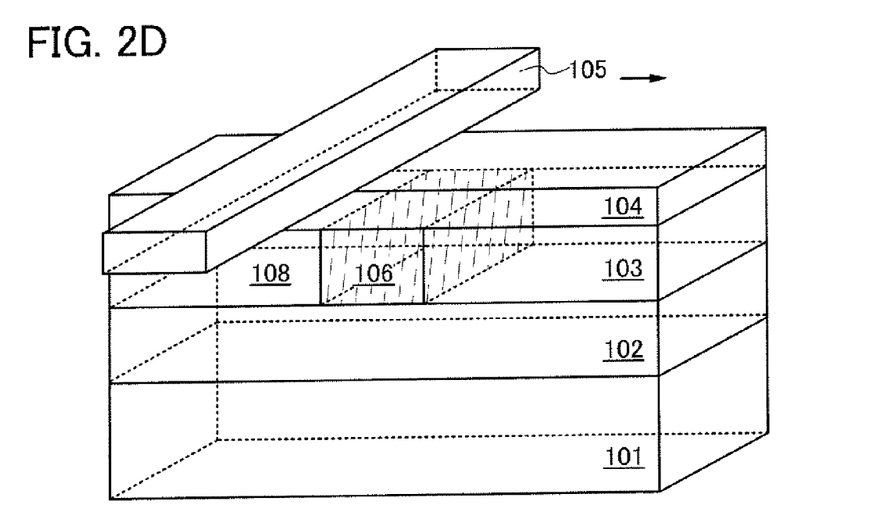

The material layer 103 is heated in a band shape from one side of the support substrate 101 by the heater 105. The heater 105 is slowly moved to the other side as indicated by an arrow. By this heating, part of the material layer 103 is melted to be a melted region 106. The material layer 103 is melted and solidified so as to be the single crystalline active material layer 108.

Alternatively, the single crystalline active material layer 108 can be formed by heating the material layer 103 in a linear shape (a band shape) by the aforementioned strip heater method, lamp method, or the like to promote solid phase growth (solid phase epitaxial growth) in the material layer 103.

Figure 3A:
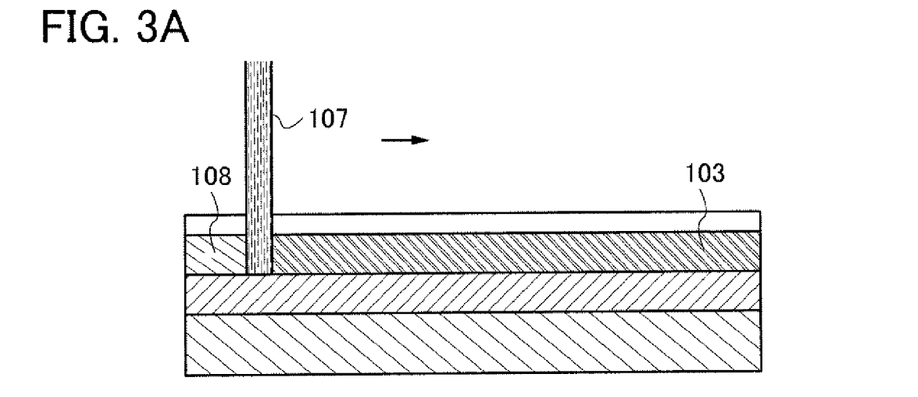
FIGS. 3A to 3C are cross-sectional views illustrating a manufacturing process of the power storage device.
Figure 3B:
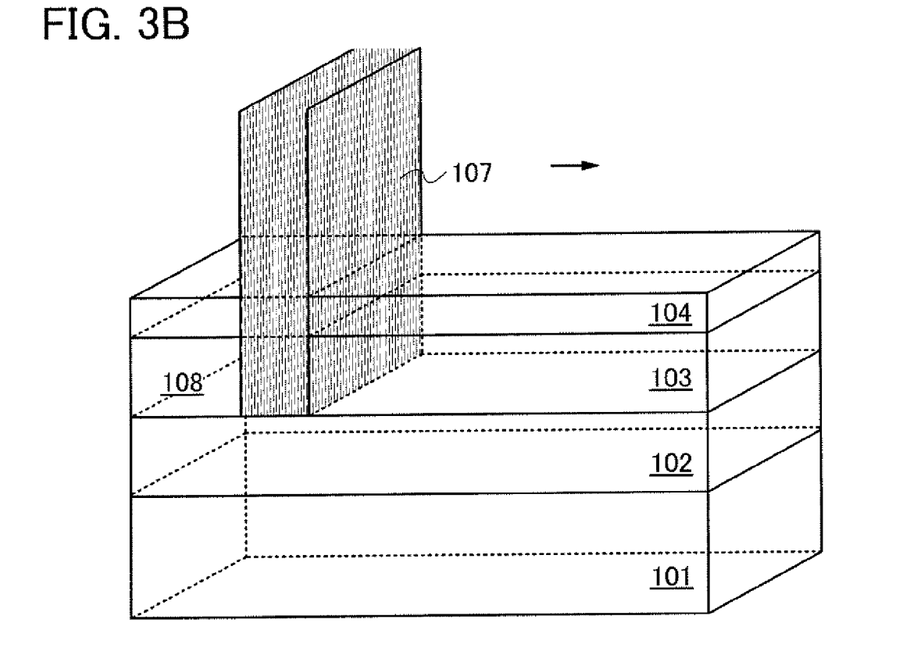

In addition, the heating may be performed by irradiation with laser beam 107 instead of the heater 105 (see FIGS. 3A and 3B). The laser beam 107 may be generated with a continuous wave laser (hereinafter referred to as a CW laser) or a pulsed laser with a repetition rate as high as greater than or equal to 10 MHz. By being irradiated with the laser beam 107, part of the material layer 103 is heated and melted to be the melted region 106. The material layer 103 is melted and solidified to be the single crystalline active material layer 108.

Figure 3C:
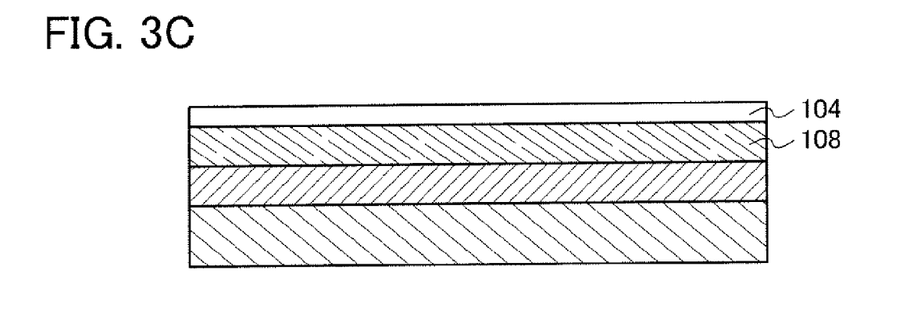

Through the above process, the single crystalline active material layer 108 over the base layer 102 can be obtained (see FIG. 3C).

Since the single crystalline active material layer 108 is a single crystalline layer having an olivine structure, lithium atoms or sodium atoms are arranged one-dimensionally therein. Therefore, ions such as lithium ions or sodium ions easily leave and enter the single crystalline layer. Since such a single crystalline layer having an olivine structure which ions can easily leave and enter is used as the active material layer, the amount of ions capable of leaving and entering the active material layer can be increased. By this, capacity of a secondary battery including the single crystalline active material layer 108 as a positive electrode active material can be increased.

In the case where an amorphous material layer, a microcrystalline material layer, or a polycrystalline material layer is used as an active material layer, distortion is formed at a crystal boundary by charging and discharging. In this embodiment, on the other hand, the single crystalline active material layer 108 is used as an active material layer, thereby suppressing distortion at a crystal boundary. Therefore, a crystal structure is prevented from being destroyed. In addition, by using the single crystalline active material layer 108, alteration of a surface of the single crystalline active material layer 108 caused by an electrolyte can be suppressed. As a result, when the single crystalline active material layer 108 is used as an active material layer, deterioration, an example of which is a reduction in capacity or the like, can be suppressed.

Figure 4A:
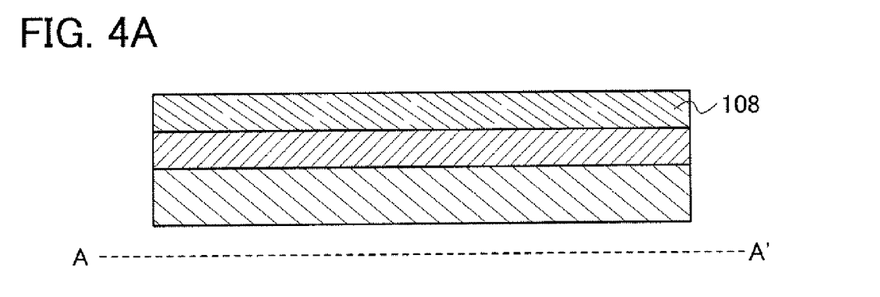
FIGS. 4A to 4D are cross-sectional views illustrating a manufacturing process of the power storage device.

Then, the protective film 104 is removed (see FIG. 4A). Note that when the protective film 104 is not necessary, formation thereof is not performed in some cases.

Figure 4B:
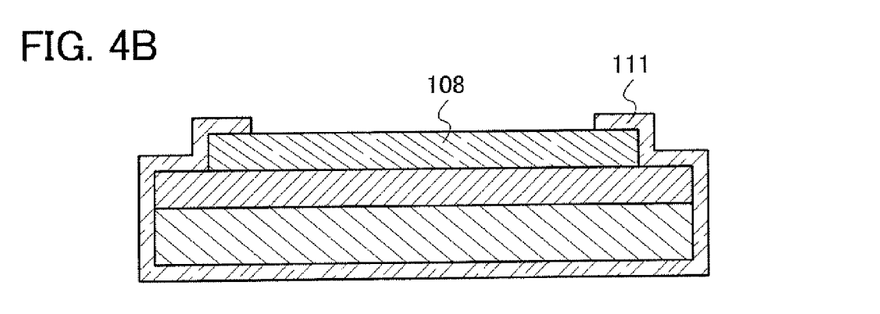

Here, an example in which part of the single crystalline active material layer 108 is removed and a current collector 111 is formed so as to be in contact with the partly removed single crystalline active material layer 108 is illustrated in FIG. 4B.

The current collector 111 is formed so as not to entirely cover a surface of the single crystalline active material layer 108, in which an ion path for ions (e.g., lithium ions or sodium ions) exists. In other words, the current collector 111 may be formed so that an ion path for ions in the single crystalline active material layer 108 is exposed. In FIG. 4B, the current collector 111 is formed so as to cover the support substrate 101, the base layer 102, and part of the single crystalline active material layer 108; however, the present invention is not limited thereto. The current collector 111 illustrated in FIG. 4B may be formed, for example, by plating or dipping.

As a material of the current collector 111, copper (Cu), aluminum (Al), nickel (Ni), titanium (Ti) and the like, may be used alone or in a compound thereof.

Figure 4C:
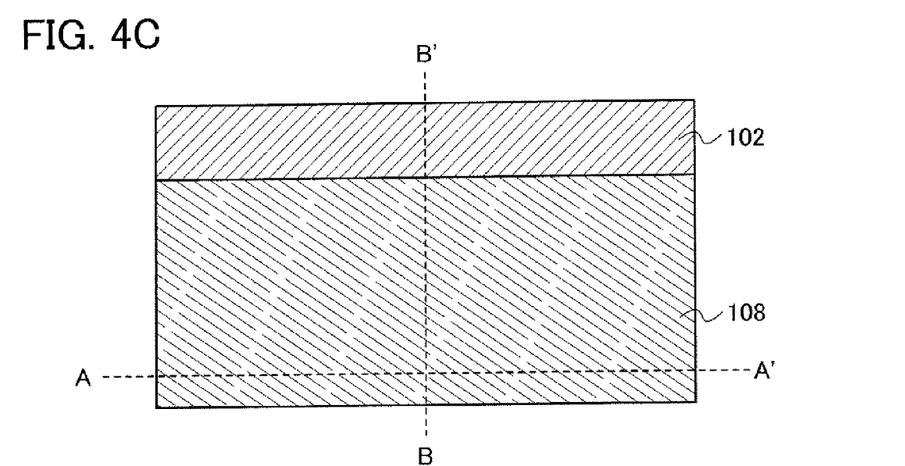
Figure 4D:
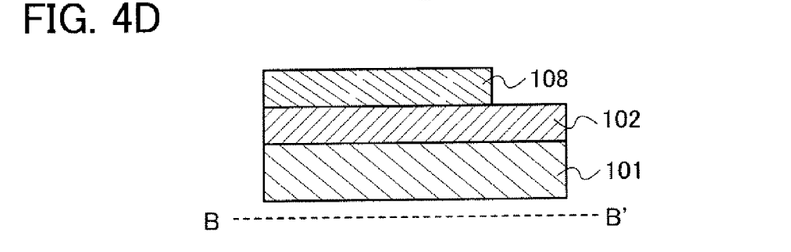

Further, in the case where the base layer 102 can be used as a current collector, part of the base layer 102 serving as a current collector is exposed as illustrated in FIGS. 4C and 4D so that another wiring can be connected thereto. FIG. 4C is a top view of FIGS. 4A and 4D. A cross-sectional view taken along line A-A' in FIG. 4C is illustrated in FIG. 4A and that taken along line B-B' in FIG. 4C is illustrated in FIG. 4D. The structure illustrated in FIGS. 4C and 4D may be obtained by forming the single crystalline active material layer 108 and removing part thereof or may be obtained by forming the material layer 103 so that part of the base layer 102 is exposed at the step illustrated in FIG. 2B.

Through the manufacturing process described above, a positive electrode of a secondary battery, which includes the single crystalline active material layer 108 as a positive electrode active material and the current collector, can be manufactured.

A secondary battery in which the above-described single crystalline active material layer 108 is used as a positive electrode active material will be described below.

As already described, the secondary battery 130 has the housing 141, the positive electrode 148 including the positive electrode current collector 142 and the positive electrode active material layer 143, the negative electrode 149 including the negative electrode current collector 144 and the negative electrode active material layer 145, the separator 146 provided between the positive electrode 148 and the negative electrode 149, and an electrolyte 147 (see FIG. 1).

As already described, either the current collector 111 or the base layer 102 may be used as the positive electrode current collector 142 of the secondary battery 130.

As the positive electrode active material layer 143 of the secondary battery 130, the single crystalline active material layer 108 is used.

As a material of the negative electrode current collector 144 of the secondary battery 130, copper (Cu), aluminum (Al), nickel (Ni), titanium (Ti) and the like, may be used alone or in a compound thereof.

As a material of the negative electrode active material layer 145 of the secondary battery 130, a compound of a material capable of insertion and extraction of alkali metal ions or alkaline earth metal ions and alkali metal, or a compound of a material capable of insertion and extraction of ions or alkaline earth metal ions and alkaline earth metal may be used. As examples of the material capable of insertion and extraction of alkali metal ions or alkaline earth metal ions, there are carbon, silicon, silicon alloy and the like. As an example of carbon capable of insertion and extraction of alkali metal ions or alkaline earth metal ions, there is a carbon material such as a fine graphite powder or a graphite fiber.

When a silicon material is used as a material of the negative electrode active material layer 145 of the secondary battery 130, a material obtained by depositing microcrystalline silicon and then removing amorphous silicon from the microcrystalline silicon by etching may be used. When amorphous silicon is removed from microcrystalline silicon, the surface area of the remaining microcrystalline silicon is increased.

Also, an alloy containing tin (Sn) may be used as a material of the negative electrode active material layer 145 of the secondary battery 130.

Alkali metal ions or alkaline earth metal ions enter and react with a layer formed using the aforesaid material which alkali metal ions or alkaline earth metal ions can leave and enter, and the negative electrode active material layer 145 is formed.

As the separator 146, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. However, a material which does not dissolve in the electrolyte 147 which is described later should be selected.

More specific examples of materials for the separator 146 are high-molecular compounds based on fluorine-based polymer, polyether such as a polyethylene oxide and a polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in a combination.

Also, the electrolyte 147 of the secondary battery 130 contains alkali metal ions or alkaline earth metal ions, and these alkali metal ions and alkaline earth metal ions are responsible for electrical conduction. The electrolyte 147 includes, for example, a solvent and an alkali metal salt or an alkaline earth metal salt dissolved in the solvent. Examples of the alkali metal salts include lithium chloride, lithium fluoride, lithium fluoroborate, sodium chloride, sodium fluoride, sodium perchlorate, and sodium fluoroborate. Examples of the alkaline earth metal salts include magnesium chloride, magnesium fluoride, magnesium perchlorate, magnesium fluoroborate, calcium chloride, calcium fluoride, calcium perchlorate, and calcium fluoroborate. These can be used either alone or in combination in the electrolyte 147. Note that in the present embodiment, an electrolyte including a solvent and an alkali metal salt or an alkaline earth metal salt is used; however, a solid electrolyte may be used as necessary.

Examples of the solvent for the electrolyte 147 include cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane and the like; alkyl phosphate esters such as trimethyl phosphate, triethyl phosphate, and trioctyl phosphate and fluorides thereof, all of which can be used either alone or in combination.

In the manner described above, a secondary battery can be formed using the positive electrode active material in this embodiment.

Since a single crystalline active material layer is used as a positive electrode active material layer in this embodiment, the amount of ions capable of leaving and entering an active material layer can be increased. Thus, capacity of a secondary battery can be increased.

Further, since the single crystalline active material layer is used as the positive electrode active material layer in this embodiment, distortion at a crystal boundary by charging and discharging is suppressed. Thus, a crystal structure is prevented from being destroyed and alteration of a surface of the single crystalline active material layer caused by an electrolyte can be suppressed. In the above-described manner, deterioration of a secondary battery, an example of which is a reduction in capacity or the like, can be suppressed.

Example 1

Example 1 is described with reference to FIGS. 5A and 5B and FIGS. 6A and 6B.

Figure 5A:
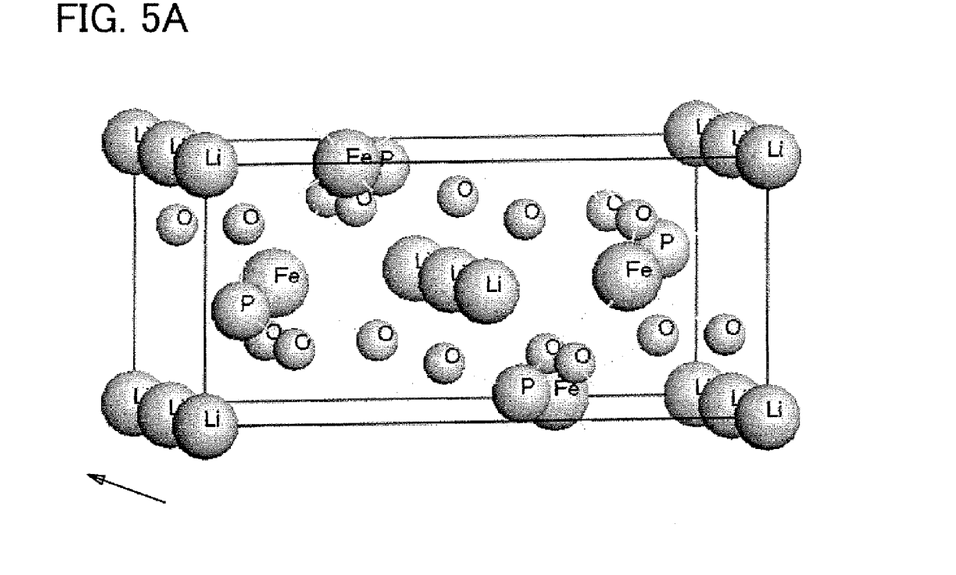
FIGS. 5A and 5B are a diagram illustrating a unit cell of LiFePO$_4$ having an olivine structure and a diagram illustrating a unit cell of NaFePO$_4$ having an olivine structure, respectively.
Figure 5B:
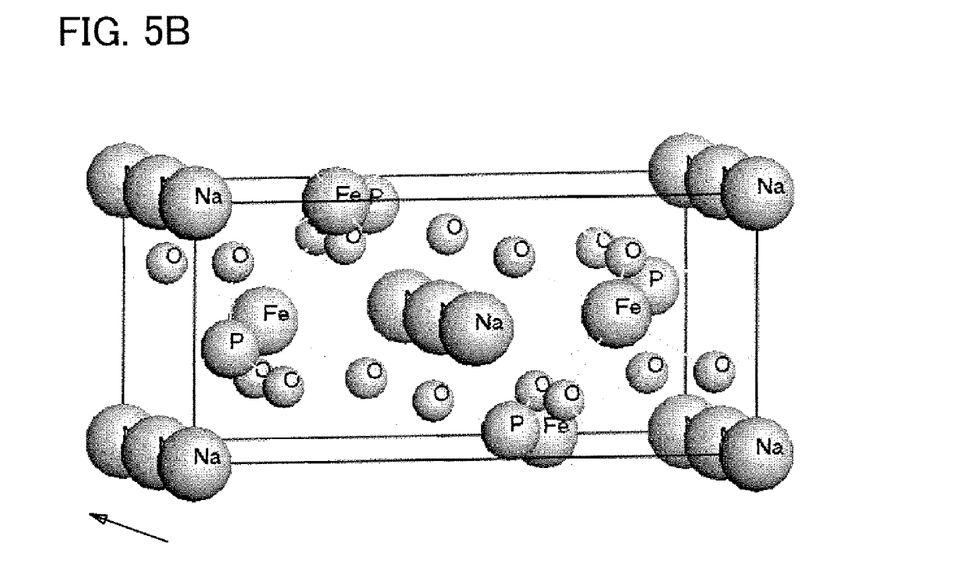

FIGS. 5A and 5B illustrate a unit cell of lithium iron phosphate (LiFePO$_4$) having an olivine structure and a unit cell of sodium iron phosphate (NaFePO$_4$) having an olivine structure, respectively.

Calculation for lithium iron phosphate (LiFePO$_4$) having an olivine structure has shown a result that lithium (Li) ions move in a <010> direction (the direction indicated by an arrow in FIG. 5A) most easily. From the above result, in Example 1, calculation was performed on the assumption that sodium (Na) ions in sodium iron phosphate (NaFePO$_4$) having an olivine structure move in a <010> direction (the direction indicated by an arrow in FIG. 5B) most easily.

Calculation results of activation energy in the case where lithium (Li) ions and sodium (Na) ions move in a <010> direction in lithium iron phosphate (LiFePO$_4$) having an olivine structure and sodium iron phosphate (NaFePO$_4$) having an olivine structure, respectively, are shown in Table 1.

TABLE 1

|  | Activation energy (meV) |
| --- | --- |
| LiFePO$_4$ having an olivine structure | 480 |
| NaFePO$_4$ having an olivine structure | 530 |

The activation energy of diffusion of lithium (Li) ions and sodium (Na) ions was measured by an NEB (nudged elastic band) method. For example, in the case of lithium iron phosphate (LiFePO$_4$), a super-cell formed by doubling a primitive cell in a c axis direction is supposed and an initial state is a state where a given ion out of eight lithium (Li) ions contained in the super-cell is removed.

Figure 6A:
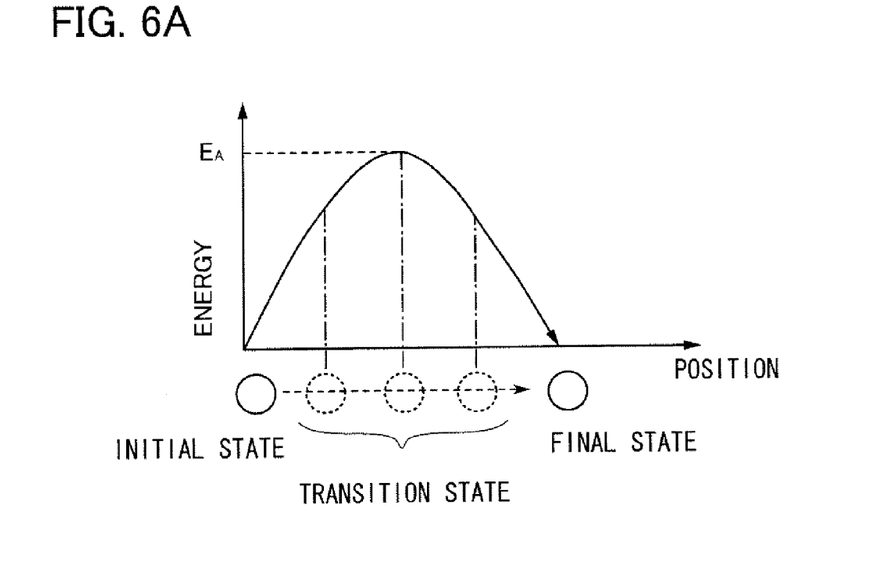
FIGS. 6A and 6B are a schematic diagram describing a change in activation energy of diffusion of Li and a diagram illustrating a diffusion path of Li ions.

A final state is a state where a lithium (Li) atom has moved from a given lithium (Li) site neighboring a lithium (Li) vacancy in the initial state (see FIG. 6A). In an NEB method, at the time of calculation for an electronic state (calculation of energy) in a transition state between the initial and final states, force or energy of a virtual elastic band between given transition states is considered, whereby an activation energy $E_A$ is found.

Figure 6B:
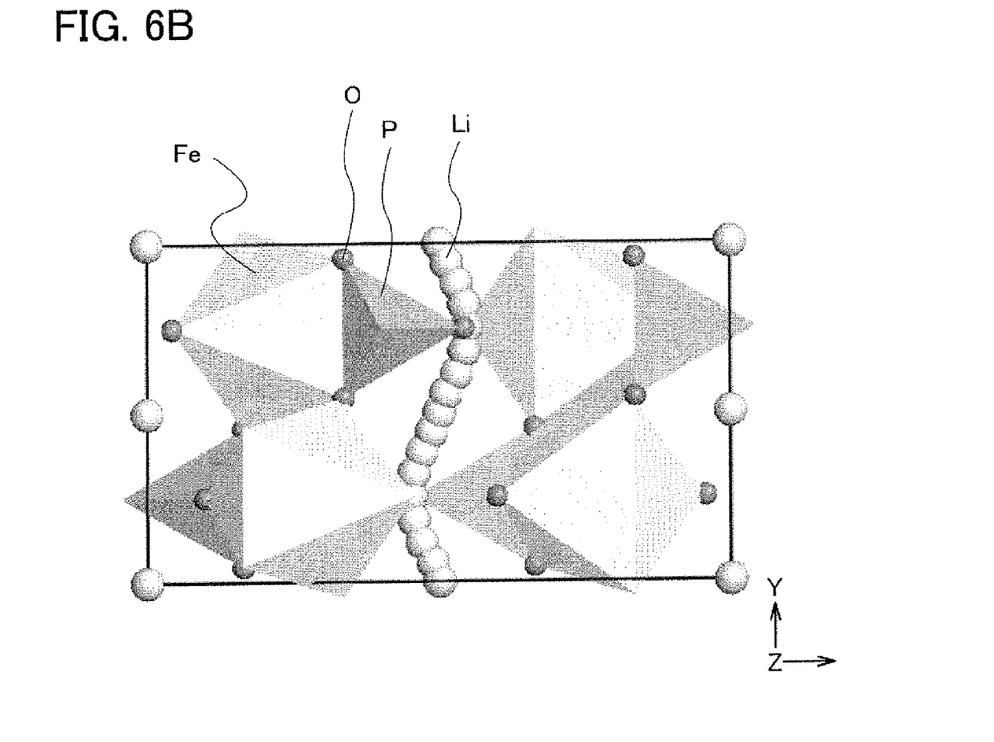

As illustrated in FIG. 6B, it was found that a diffusion path of a lithium (Li) ion was not straight but meandered. The lithium (Li) ion moved at a low energy level being kept away from iron (Fe) which is a positive ion and approaching oxygen (O) whose electronegativity is high.

A battery voltage in the case of using lithium iron phosphate (LiFePO$_4$) having an olivine structure and that in the case of using sodium iron phosphate (NaFePO$_4$) having an olivine structure were simulated.

A reaction formula of a lithium ion battery using lithium iron phosphate (LiFePO$_4$) and metallic lithium for a positive electrode material and a negative electrode material, respectively, is Formula 1.

[Formula 1]

On the assumption that charging and discharging are completed, that is, when x=1 in Formula 1, the battery voltage can be expressed by Formula 2 using difference in a chemical potential between lithium (Li) ions in the positive electrode and those in the negative electrode. By this, energy E of each material was found and the battery voltage V could be then calculated using the energy E.

[Formula 2]

In the calculation of the battery voltage, as an initial state, a state was assumed where the lithium iron phosphate (LiFePO$_4$) which was an active material was filled with lithium (Li). The total energy of the system in the above state was calculated.

On the other hand, as a final state, a state was assumed where lithium (Li) were all extracted from the lithium iron phosphate (LiFePO$_4$) which was the active material and entered the metallic lithium (Li) which was the negative electrode. The total energy of the system in the above state was calculated.

The battery voltage V could be found by calculation of energy gap between the final state and the initial state using chemical reaction formulae of Formula 1.

TABLE 2

|  | LiFePO$_4$ | NaFePO$_4$ |
|---|---|---|
| Calculated value | 3.4918 [V] | 3.0210 [V] |
| Experimental value | 3.5 [V] | — |

When sodium iron phosphate (NaFePO$_4$) having an olivine structure which contains sodium having a larger Clarke number than lithium can be used as a positive electrode active material, manufacturing cost of a secondary battery can be suppressed.

Note that although the metallic lithium was assumed as the negative electrode active material in the calculation in this example, carbon, silicon, silicon alloy or the like can be used as a negative electrode active material, as described in Embodiment.

A carbon material is particularly preferable as a negative electrode active material because it has a potential which is lower than a standard hydrogen electrode potential and is as low as the potential of metallic lithium.

Specific description is as follows.

The difference between the potential of graphite and the potential of lithium compared with a standard electrode potential is preferably greater than or equal to 0.01 V and less than or equal to 0.23 V, more preferably, greater than or equal to 0.07 V and less than or equal to 0.23 V.

The calculated value of the battery voltage V in the case of using metallic lithium and lithium iron phosphate as a negative electrode active material and a positive electrode active material, respectively, was 3.4918 V (see Table 2). Based on the calculated value of the battery voltage in the case of using the metallic lithium and the lithium iron phosphate as the negative electrode active material and the positive electrode active material, respectively, a battery voltage in the case of using graphite and lithium iron phosphate as a negative electrode active material and a positive electrode active material, respectively, was 3.2618 V to 3.4218 V.

From the above results, the calculated battery voltages can be seen substantially the same both in a case of using metallic lithium as a negative electrode active material and in a case of using a carbon material as a negative electrode active material.

This application is based on Japanese Patent Application serial no. 2009-210242 filed with Japan Patent Office on Sep. 11, 2009, the entire contents of which are hereby incorporated by reference.

The invention claimed is:

1. A power storage device comprising:
a positive electrode including a positive electrode active material layer and a positive electrode current collector, the positive electrode active material layer in contact with a base layer over a support substrate and comprising single crystalline sodium iron phosphate layer having an olivine structure with a crystal axis oriented in a <010> direction;
a negative electrode including a negative electrode active material and a negative electrode current collector; and
a separator provided between the positive electrode and the negative electrode,
wherein a lattice constant of the base layer is equivalent to that of the single crystalline sodium iron phosphate layer.

2. The power storage device according to claim 1, wherein the base layer is formed using a material selected from the group consisting of β-Ta, $Cu_2[Cd_{0.79}Fe_{0.17}Mn_{0.04}]GeS_4$, $Cu_2FeGeS_4$, $CuFeS_2$, $CuGaS_2$, $Cu_3[As_{0.644}Sb_{0.356}]S_4$, $Cu_9Fe_9S_{16}$, $CaV_3O_7$, $WO_3 \cdot H_2O$, $Fe_2SiO_4$, $Mg_2SiO_4$, $Li_3PO_4$, $Cu_3Fe_4[VO_4]_6$, $[Fe_{0.292}Mg_{0.708}]_2SiO_4$, $NaSiO_3$, and $LiAlSiO_4 \cdot H_2O$.

3. The power storage device according to claim 1, wherein the support substrate is selected from the group consisting of a silicon substrate, a sapphire substrate, a glass substrate and a ceramic substrate.

4. The power storage device according to claim 1, wherein the support substrate is a silicon substrate, and the base layer is formed over a (100) plane of the silicon substrate.

5. The power storage device according to claim 1 further comprising an electrolyte, wherein the positive electrode and the negative electrode and the separator are provided in the electrolyte.

6. A power storage device comprising:
a positive electrode including a positive electrode active material layer and a positive electrode current collector, the positive electrode active material layer in contact with a base layer over a support substrate and comprising single crystalline lithium iron phosphate layer having an olivine structure with a crystal axis oriented in a <010> direction;
a negative electrode including a negative electrode active material and a negative electrode current collector; and
a separator provided between the positive electrode and the negative electrode,
wherein a lattice constant of the base layer is equivalent to that of the single crystalline lithium iron phosphate layer.

7. The power storage device according to claim 6, wherein the base layer is formed using a material selected from the group consisting of β-Ta, $Cu_2[Cd_{0.79}Fe_{0.17}Mn_{0.04}]GeS_4$, $Cu_2FeGeS_4$, $CuFeS_2$, $CuGaS_2$, $Cu_3[As_{0.644}Sb_{0.356}]S_4$, $Cu_9Fe_9S_{16}$, $CaV_3O_7$, $WO_3 \cdot H_2O$, $Fe_2SiO_4$, $Mg_2SiO_4$, $Li_3PO_4$, $Cu_3Fe_4[VO_4]_6$, $[Fe_{0.292}Mg_{0.708}]_2SiO_4$, $NaSiO_3$, and $LiAlSiO_4 \cdot H_2O$.

8. The power storage device according to claim 6, wherein the support substrate is selected from the group consisting of a silicon substrate, a sapphire substrate, a glass substrate and a ceramic substrate.

9. The power storage device according to claim 6, wherein the support substrate is a silicon substrate, and the base layer is formed over a (100) plane of the silicon substrate.

10. The power storage device according to claim 6 further comprising an electrolyte, wherein the positive electrode and the negative electrode and the separator are provided in the electrolyte.

* * * * *